United States Patent Office 3,131,686
Patented May 5, 1964

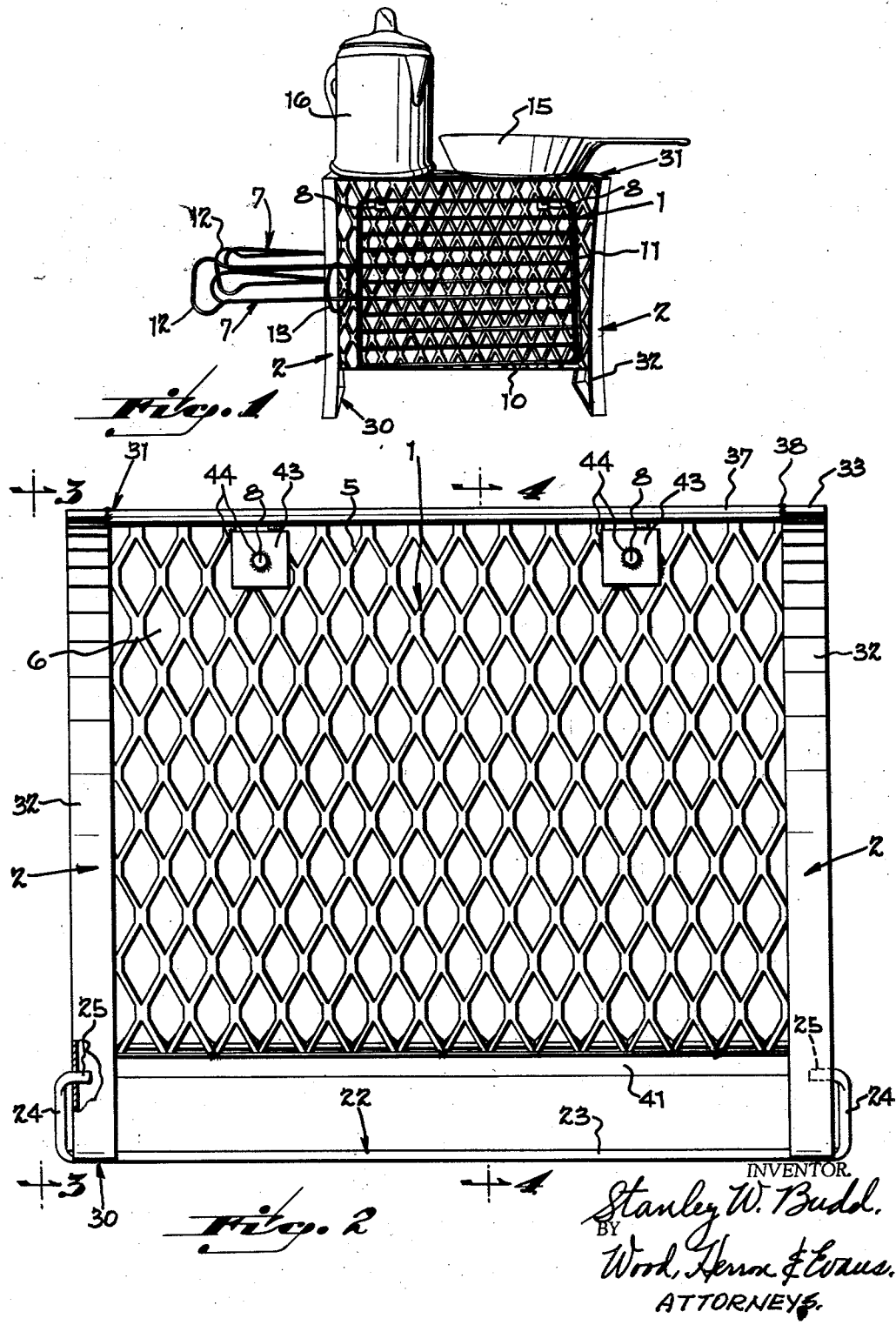

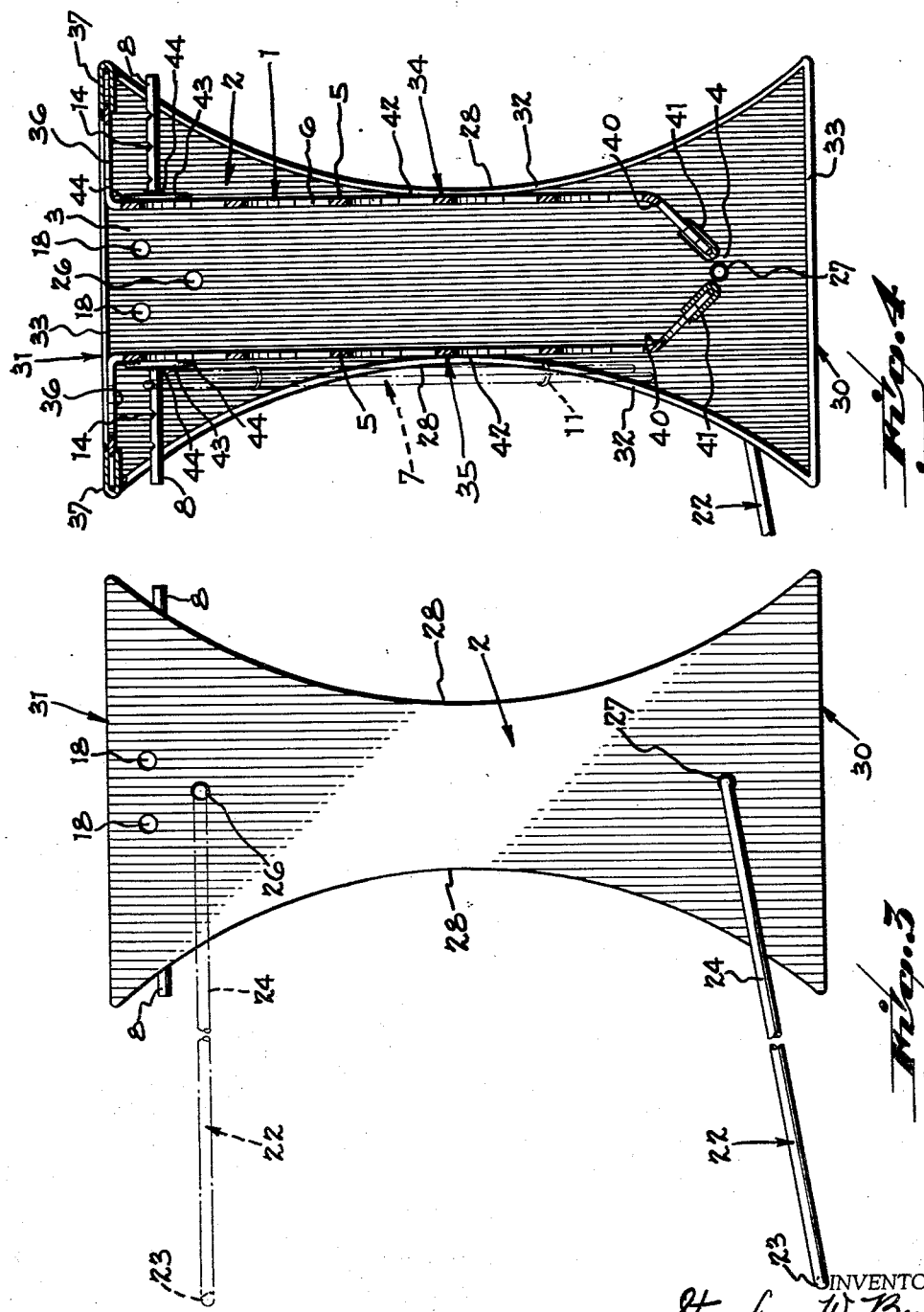

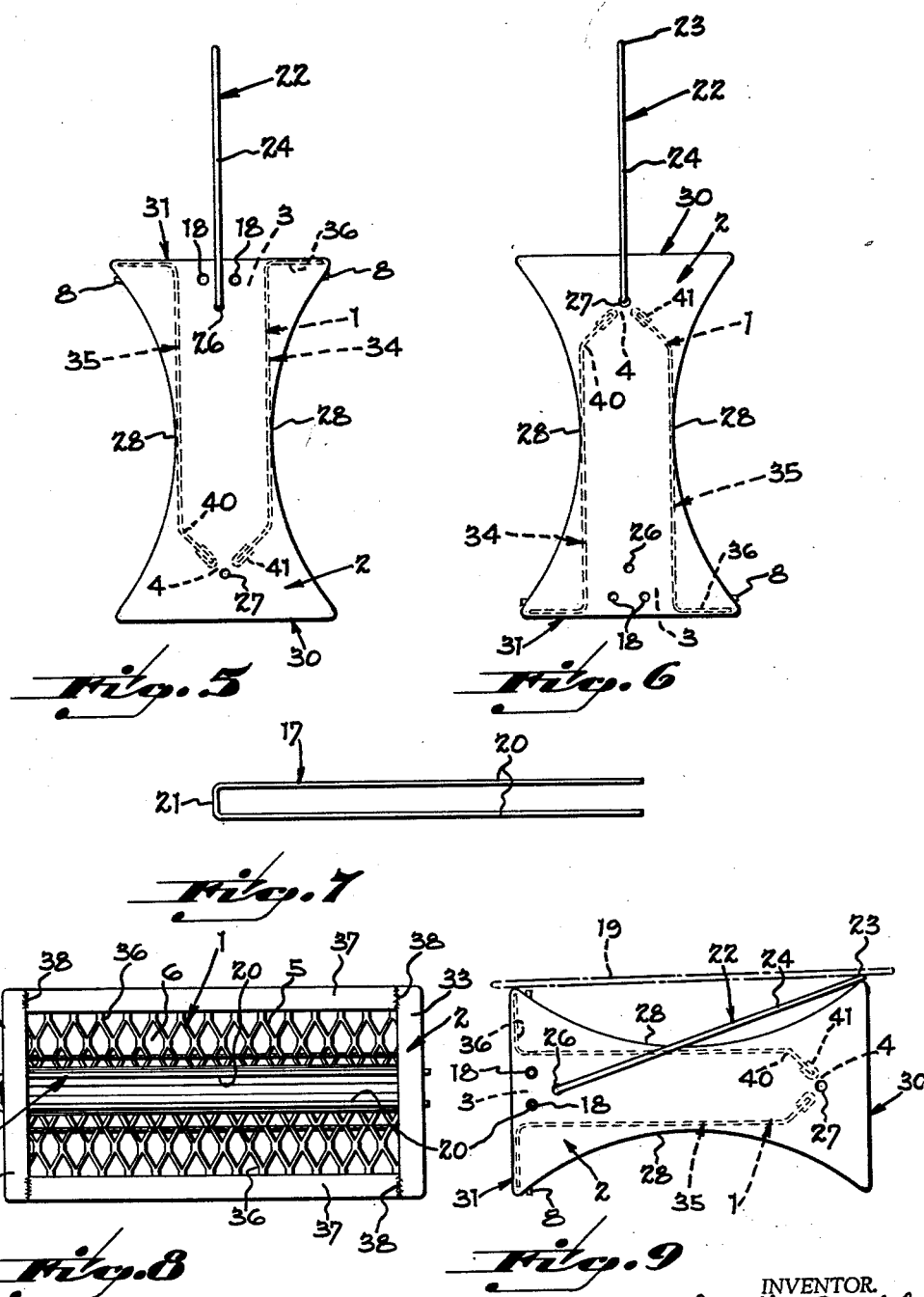

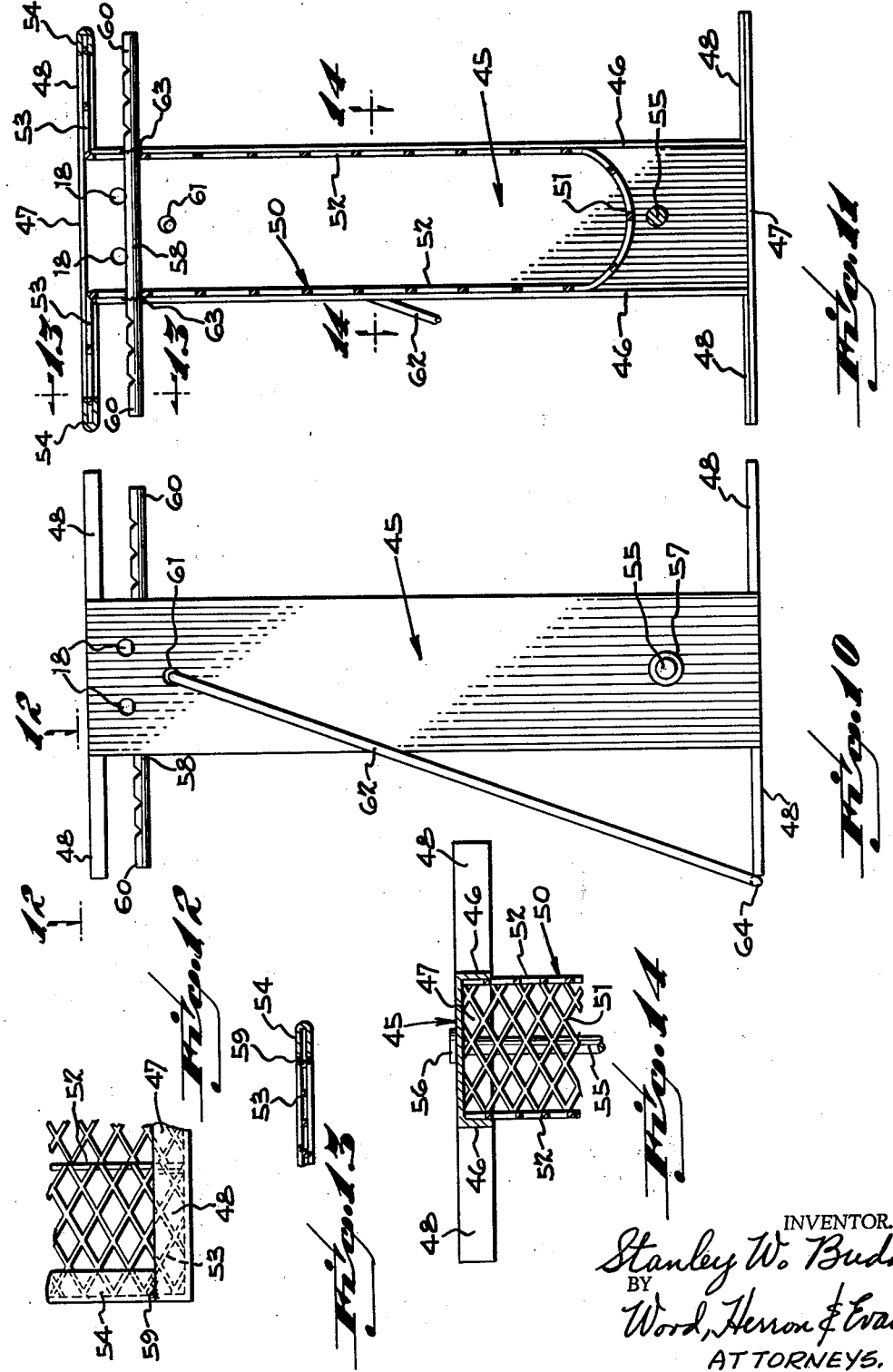

3,131,686
PORTABLE COOKING GRILL
Stanley W. Budd, 10285 Kerrianna Drive,
Cincinnati 42, Ohio
Filed Mar. 21, 1962, Ser. No. 181,293
3 Claims. (Cl. 126—25)

This invention relates to portable cooking grills or broilers for use on picnics, camping trips and other outdoor uses. More specifically, the present grill is of the type in which the food, such as steaks, chops and the like may be suspended in vertical positions along the sides of the fire bed so that grease and drippings fall to the ground rather than into the fire bed, thereby to eliminate smoke and flames which interfere with the cooking action and impair the flavor of the food.

One of the primary objectives of the invention has been to provide a light-weight portable grill of simplified design, inexpensive construction, and low fuel consumption, having a fuel basket adapted to sustain a relatively thin fire bed in a vertical plane, such that the food may be suspended in a vertical position along both sides of the fire bed to be broiled by radiant heat.

In general, the present grill comprises a pair of end plates formed of sheet metal, combined with a relatively narrow vertical fuel basket formed of expanded or perforated metal mounted in a lengthwise position between the end plates. The end plates, which are of one-piece construction, each include upper and lower pairs of lateral extensions or flanges which project outwardly from opposite edges of the end plates. The lower extensions of the end plates provide a relatively broad base for stabilizing the grill in its normal upright position, while the lateral extensions at the upper end provide a relatively wide horizontal surface for supporting one or more cooking utensils above the fire when the grill is in its upright position.

Another objective of the invention has been to provide a simplified structure wherein the grill may be used either in its upright position for broiling the foods by radiant heat while suspended in vertical planes relative to the vertical fire bed, but which may be converted to conventional grilling with the fuel basket in a horizontal position, simply by placing the grill on its side, with substantially no rearrangement of its parts.

According to this aspect of the invention, the outwardly projecting flanges of the end plates are arranged to support the fuel basket in a horizontal plane when the grill is placed upon its side, with the food or cooking utensils both placed above the fire bed. In other words, the outwardly projecting flanges serve the double function of stabilizing the grill in its normal upright position, and also of supporting it in a level position when the grill is placed on its side.

A further objective has been to provide a grill having a carrying handle or bail pivotally connected thereto for carrying the grill in an upright position, and wherein the handle serves the additional function of a support element coacting with the outwardly projecting flanges of the end plates for supporting the food or utensils in a plane spaced above the fuel basket when the grill is used in its horizontal position.

According to this concept, the bail is generally U-shaped to provide a pair of parallel limbs joined by a crosspiece, the opposite ends of the limbs being bent inwardly to form pivot pins. The end plates of the grill are provided with apertures near their upper ends adapted to receive the pivot pins, so that the grill may be carried by the bail in an upright position. When the grill is placed upon its side for cooking above the fuel bed, the food may be placed directly upon the fuel basket for fast cooking. On the other hand, for slow cooking, the bail may be pivoted to a position wherein its crosspiece rests upon the outwardly projected flanges of the end plates. In this position, the food clamping frame, or a support rack for the food or utensils may be placed in a horizontal position spanning the crosspiece and opposite outwardly projecting flanges of the end plates in a plane spaced above the top surface of the fuel basket, thereby providing a slow cooking action.

If desired, the end plates may be provided with a second pair of apertures for connecting the bail to the lower portion of the grill instead of its upper portion. In other words, the limbs of the bail may be conveniently sprung apart to interchangeably connect the bail to the upper or lower portion of the end plates. When the bail is connected to the lower apertures, the grill may be lifted by the bail and swung to an inverted position for dumping the used charcoal in a convenient manner from the open upper end of the hot fuel basket.

The various features and advantages of the invention will be more fully apparent to those skilled in the art from the following detailed description taken in conjunction with the drawings.

In the drawings:

FIGURE 1 is a perspective view of a portable cooking grill or broiler embodying the principles of this invention.

FIGURE 2 is a side elevation of the grill in its normal upright position, corresponding to FIGURE 1.

FIGURE 3 is an end elevation of the grill as viewed along the line 3—3 of FIGURE 2.

FIGURE 4 is a cross sectional view of the grill taken along the line 4—4 of FIGURE 2.

FIGURE 5 is an end elevation similar to FIGURE 3, showing the bail or handle connected to the upper portion of the grill, adapting it to be transported in its normal upright position.

FIGURE 6 is a view similar to FIGURE 5, showing the bail attached to the lower portion of the grill for inverting and dumping the charcoal therefrom.

FIGURE 7 is a view illustrating the detachable retainer bar which is inserted in the grill to confine the fuel therein when the grill is used in its horizontal position.

FIGURE 8 is a side elevation, showing the grill in its horizontal position with the retainer bar of FIGURE 7 inserted therein.

FIGURE 9 is an end elevation of the grill in its horizontal position, as projected from FIGURE 8.

FIGURE 10 is an end elevation, generally similar to FIGURE 3, showing a cooking grill of slightly modified construction.

FIGURE 11 is a sectional view, similar to FIGURE 4, further illustrating the modified arrangement.

FIGURE 12 is a fragmentary view taken along line 12—12 of FIGURE 10, illustrating the top flange arrangement of the end plates.

FIGURE 13 is a fragmentary sectional view taken along line 13—13 of FIGURE 11, detailing the flange structure which joins the edge portion of the expanded metal to the upper and lower flanges of the sheet metal end plates.

FIGURE 14 is a sectional view taken along line 14—14 of FIGURE 11, illustrating the flange arrangement for attaching the vertical edge portions of the expanded metal to the sheet metal end plates.

*General Arrangement and Operation*

Described generally with reference to FIGURES 1–9, which represents one embodiment of the invention, the cooking grill comprises a basket or fuel container, indicated generally at 1, which is formed preferably of expanded metal, or which may be fabricated from perforated sheet metal. The basket forms a container for the fuel, usually pieces of charcoal, and facilitates the flow of air thru the charcoal to create rapid, efficient combustion. The basket 1 is mounted between a pair of end plates 2—2 which are formed preferably of a heavy grade of sheet metal. As best shown in FIGURE 4, the upper end of the basket is open as at 3 for loading the charcoal therein, while the lower portion of the basket is partially closed off as at 4 to support the fuel. The expanded metal basket comprises a metallic web 5 delineating openings 6 which provide ventilation but which are sufficiently small to confine the pieces of charcoal within the basket.

As best shown in FIGURE 4, the fuel basket 1 is relatively slender so as to provide a relatively thin fire bed to conserve charcoal, but at the same time, to form two vertical radiant heating surfaces at opposite sides. When utilized in its upright position shown in FIGURE 1, the foods to be grilled or broiled, for example steaks or chops, are confined within individual food clamping or grilling frames, indicated generally at 7, which are suspended from pairs of hanger pins 8 projecting outwardly from the upper portion of the basket at opposite sides.

The clamping frames are of conventional design, each comprising a pair of generally rectangular racks 10 (FIGURE 1) formed of rod stock, the pair of racks being hingedly connected together at their outer edges as at 11. The opposite edge of each rack 10 includes an outwardly projecting handle 12. Each pair of handles 12 includes a ring 13 for holding the racks 10—10 in clamping engagement with the food to be broiled. Thus, the steak to be grilled is placed upon one of the racks 10, the handles 12 are swung toward one another, then the ring 13 is slipped over the handles to hold the two racks 10—10 into clamping engagement with the steak. The rack is then slipped upon the pair of hanger pins 8 at one side of the grill so as to suspend the steak in a vertical plane in a position parallel with and spaced outwardly from the vertical side of the fuel basket 1. A second steak may be similarly suspended in a vertical position from the hanger pins 8 at the opposite side of the grill.

In order to regulate the spacing between the fire basket and clamping frames 7—7, each hanger pin 8 is provided with a series of spaced notches 14 (FIGURE 4). These notches interfit the framing rod of the clamping or grilling frame to hold the frame at a selected spacing with respect to the vertical side of the basket, thereby to regulate the amount of radiant heat which acts upon the steak.

It will be understood at this point that the steak may be turned very conveniently by grasping the grill frame 7 by its handles 12, slipping the frame from the hanger pins 8, then replacing it on the hanger pins in reversed position. By virtue of this arrangement, the food may be suspended at opposite sides of the fuel basket for concurrent cooking, utilizing a relatively small charcoal bed while creating a highly efficient broiling action. Moreover, fat or drippings from the food will drop by gravity in a downward direction alongside the fuel bed; therefore, eliminating smoke and flames which ordinarily interfere with the cooking action or detract from the food flavor.

When used in the upright position (FIGURE 1), the top surface of the grill provides a flat support area for cooking utensils, such as a frying pan 15 and coffee pot 16. By virtue of this arrangement, the user takes advantage of the waste heat for additional cooking operations while other food is being grilled.

In certain instances, it may be desired to grill foods in the conventional manner, that is, with the food placed directly above the fire bed. In this case, the grill is placed upon its side, as shown in FIGURES 8 and 9, and the detachable retainer bar 17 is placed across the open end 3 of the fuel basket to confine the fuel. For this purpose, the end plates 2—2 are each provided with a pair of apertures 18—18 (FIGURES 3 and 4). As viewed in FIGURE 7, the retainer bar 17 is generally U-shaped, providing a pair of spaced parallel limbs 20—20 formed of rod stock and joined by a cross piece 21. The spacing of the limbs 20—20 corresponds approximately with the spacing of the apertures 18—18, such that the limbs 20 of the retainer bar may spring slightly toward one another upon being slipped through the apertures 18, thereby to hold the bar in place by friction.

In order to permit the grill to be carried in a convenient manner, there is provided a generally U-shaped bail or handle 22. The handle is formed of rod stock and comprises a cross piece 23 having parallel limbs 24—24 (FIGURE 2). The outer end of each parallel limb 24 is bent inwardly at right angles to form respective pivot pins 25—25 engageable with apertures formed in the end plates 2—2. Thus, when the grill is to be carried in its upright position (FIGURE 5), then the limbs 24 are sprung outwardly to permit the pivot pins 25 to be inserted within the apertures 26, which are formed in the upper portion of the end plates 2—2 between and below the apertures 18—18.

In order to dump the fuel, or to carry the grill in an inverted position, the bail 22 is disengaged from the apertures 26 at the upper portion of the grill, and its pivot pins 25 are inserted into the apertures 27—27 as indicated in full lines in FIGURE 3. This may be done while the grill is in its upright position as shown in this view. The grill is then inverted by lifting it by the handle, thereby to dump the used charcoal from the open upper end 3 of fuel basket, as shown in FIGURE 6.

In cooking with the grill on its side (FIGURES 8 and 9), the food may be placed directly upon the top surface of the horizontal fuel basket 1 for fast broiling. However, if slower cooking is desired, then the food, or the cooking utensils, may be spaced upwardly above the fuel bed, utilizing the handle 22 as a support element at one side of the grill. For this purpose, the limbs 24 of the handle have a sufficient length to shift the bail crosspiece 23 into engagement with the outwardly projecting portions of the ends plates when the handle is swung to the position shown in FIGURE 9. The food clamping frames 7, or a suitable cooking rack or tray, indicated at 19 in broken lines (FIGURE 9) may then be placed in a position spanning the crosspiece 23 and the outwardly projecting portions of the end plates at the opposite side. The bail thus supports the food or utensils parallel with and spaced above the fuel basket for slow cooking or for keeping the cooked food hot.

*Structural Details*

In the form of the invention shown in FIGURES 1–9, the sheet metal end plates have concave side edges 28—28 (FIGURES 3 and 4) which provide a relatively wide base section 30 and top section 31. The wide base section 30 provides a stabilized support when the grill is in its upright position, and the top section 31 provides a flat surface having sufficient width to support the cooking vessels, as indicated in FIGURE 1. In order to impart rigidity to the sheet metal end plates, the concave side edges 28 each include a respective inturned flange 32 (FIGURE 4). The base section 30 and top section 31 each include similar inturned flanges 33—33. It will be noted that the base section 30 and top section 31 are of equal width (FIGURE 3) so as to support the fuel basket 1 in a level position when the grill is placed on its side as shown in FIGURE 9.

The expanded metal basket 1, in the embodiment illustrated in FIGURE 4, is in the form of two sections 34 and 35 of identical construction. Each section includes a top flange 36 bent outwardly at right angles, thus forming a support surface for the cooking utensils when in the upright position. The marginal edge of each top flange 36 is reinforced by a sheet metal strip 37 (FIGURES 4 and 8) which is generally U-shaped in cross section. Each reinforcing strip 37 may be secured to the expanded metal flange 36 by brazing or spot welding.

The opposite ends of each reinforcing strip 37 are secured to the top and bottom flanges 33 by welding or brazing as indicated at 38 in FIGURE 8.

The lower portions of the basket sections 34 and 35 are bent inwardly toward one another as at 40 (FIGURE 4) to form the partially closed end portion of the basket, as previously indicated at 4. The marginal edge portion of each bent section 40 is reinforced by a sheet metal strip 41, which is U-shaped in cross section, similar to the reinforcing strips 37 at the top of the grill. The strips 41 may be brazed or welded to the expended metal and their opposite ends may be joined by welding to the end plates 2—2. The intermediate portion of each basket section 34 and 35 may also be brazed or welded as at 42 to the side flanges 32 (FIGURE 4) at the portions which contact the basket sections.

As best shown in FIGURES 2 and 4, the hanger pins 8 project outwardly from respective mounting pads 43, which are formed of sheet metal. The end of each pin is welded as at 44 to its mounting plate and the plate is also welded as at 44 to the vertical side wall of the basket.

Modified Structure

The modified grill shown in FIGURES 10-14 is similar in principle to the structure disclosed in FIGURES 1-9 and represents a simplified form of the invention. Thus, as shown in FIGURES 10 and 11, the sheet metal end plates 45—45 are provided with straight side edges, as distinguished from the curved edges 28—28 of FIGURE 3. The straight side edges are delineated by pairs of inturned flanges 46—46 (FIGURES 11 and 14) and the upper and lower edges of the end plates are provided with similar inturned top and bottom flanges 47—47.

The top and bottom flanges 47—47 are of the same width as the side flanges 46 (FIGURE 14) and project outwardly as at 48 beyond the side flanges on opposite sides of the grill. The outwardly projecting flanges 48 are formed as an integral part of the end plates 45 and impart a generally I-shaped configuration to the grill, as viewed from the end (FIGURE 10). The outwardly projecting portions 48 of the lower flanges 47 thus stabilize the grill in its normal upright position. As explained below, the projecting portions 48 of the upper flanges 47 provide a supporting surface for the cooking utensils.

It will also be understood that the outwardly projecting flange portions 48 support the grill in a level position when it is placed upon its side, as explained previously with reference to FIGURES 8 and 9. In the preferred arrangement, the outwardly projecting flanges 48 are doubled upon themselves to impart stiffness to the structure.

As best shown in FIGURE 11, the fuel basket 50 is formed from expanded metal as described earlier. However, in order to simplify the structure, the basket 50 is of one-piece construction consisting of a length of expanded or perforated metal bent to a U-shaped configuration (FIGURE 11) with a curved bottom section 51. The vertical sides 52 of the fuel basket seat against the inner surface of the side flanges 46—46 at opposite sides of the grill.

The upper portions of the fuel basket are bent outwardly to form respective horizontal flanges 53—53 (FIGURE 11) having opposite ends which are interfitted between the doubled, outwardly projecting top flanges 48 and brazed in place. In addition, the outer side marginal portions of the horizontal flanges 53 are reinforced by means of sheet metal strips 54 (FIGURES 11 and 12). The strips 54 are also U-shaped in cross section and embrace the marginal portions of the flanges 53 of the fuel basket. The strips 54 may be brazed or welded to the expanded metal and their opposite ends are joined to the flanges 48 by brazing, as indicated at 59 (FIGURE 12).

The main body of the fuel basket 50 preferably is clamped between the end plates 45—45 to simplify fabrication. For this purpose there is provided a tie rod 55 extending through the end plates and located immediately below the curved portion 51 of the fuel basket. One end of the tie rod includes a head 56 (FIGURE 14) and its opposite end is provided with a clamping element or a nut 57 (FIGURE 10). This arrangement clamps the basket securely in place; however, the marginal portions of the basket may also be welded or brazed to the side flanges 46 at spaced points along the flanges, if desired.

In the simplified arrangement, the hanger pins are in the form of one-piece rods 58 (FIGURE 11) passing through the openings of the expanded metal and brazed thereto as at 63. The rods 58 have sufficient length to project outwardly beyond the fuel basket on opposite sides as at 60 to suspend the food clamping frames, as explained earlier.

When the grill is to be used in its horizontal position, the retainer bar 17 (FIGURE 7) is inserted through the apertures 18 of the end plates, as noted earlier. In the present structure, the hanger rods 58 are located in a plane such that they partially intercept the parallel limbs 20 of the retainer bar. This causes the parallel limbs to be sprung slightly by the rods 58, thereby to frictionally hold the retainer bar in place.

The side plates 45 are provided with apertures 61—61 arranged to pivotally connect a bail 62, similar to the bail or handle 22. As shown in FIGURE 10, the crosspiece 64 of the bail is arranged to rest upon the outer ends of the lower flanges 48 in the manner described earlier with reference to FIGURE 9. The bail 62 and the outwardly projecting base flanges 48 thus coact to provide a supporting surface spaced above the fuel basket when the grill is turned on its side, as explained earlier.

Having described my invention I claim:

1. A portable cooking grill adapted to be used selectively in an upright position or in a generally horizontal position, said grill comprising a fuel basket formed of sheet metal having apertures formed therein, said fuel basket normally residing in said upright position and having a pair of generally vertical side walls spaced apart from one another, a pair of end plates secured to the opposite ends of the fuel basket, each of said end plates being symmetrical in outline configuration, each end plate being of one-piece sheet metal construction and having upper and lower pairs of lateral extensions projecting horizontally outwardly in opposite directions with the grill in said upright position, the upper and lower edges of said lateral extensions being delineated by respective parallel upper and lower lateral reinforcing flanges extending inwardly therefrom, said lower lateral reinforcing flanges forming a base adapted to rest upon the ground to support and stabilize the grill in said upright position, the upper edges of the vertical side walls of said fuel basket having longitudinal flanges projecting outwardly in opposite directions in a horizontal plane, a pair of longitudinal reinforcing strips attached to the outer edge portions of the flanges of the fuel basket, said longitudinal reinforcing strips being disposed in the plane of the said upper lateral reinforcing flanges of the end plates and having opposite ends attached to the said upper lateral flanges, said upper lateral flanges of the end plates coacting with the longitudinal flanges of the fuel basket and with the said longitudinal reinforcing strips to form a horizontal utensil-supporting surface at the top of the grill with the grill in said upright position, and hanger elements projecting outwardly from the fuel basket and adapted to suspend food racks in vertical planes along the vertical side walls of the fuel basket, the outer ends of the upper and lower pairs of lateral extensions of the end plates being disposed in parallel planes and adapted to engage the ground when the grill is shifted from the upright position to said horizontal position, whereby said extensions support the fuel basket in said generally horizontal position for cooking above one side wall of the fuel basket.

2. A portable cooking grill adapted to be used selectively in an upright position or in a generally horizontal position, said grill comprising a fuel basket formed of sheet metal having apertures formed therein, said fuel basket normally residing in said upright position and having a pair of generally vertical side walls spaced apart from one another, a pair of end plates secured to the opposite ends of the fuel basket, each of said end plates being symmetrical in outline configuration, each end plate being of one-piece sheet metal construction and having upper and lower pairs of lateral extensions projecting horizontally outwardly in opposite directions with the grill in said upright position, the upper and lower edges of said lateral extensions being delineated by respective parallel upper and lower lateral reinforcing flanges extending inwardly therefrom, said lower lateral reinforcing flanges forming a base adapted to rest upon the ground to support and stabilize the grill in said upright position, the upper edges of the vertical side walls of said fuel basket having longitudinal flanges projecting outwardly in opposite directions in a horizontal plane, a pair of longitudinal reinforcing strips attached to the outer edge portions of the flanges of the fuel basket, said longitudinal reinforcing strips being generally U-shaped in cross section and embracing the outer marginal portions of the flanges of the fuel basket to reinforce the same, said longitudinal reinforcing strips being disposed in the plane of the upper lateral reinforcing flanges, said U-shaped reinforcing strips having end portions secured to the upper lateral reinforcing flanges of the end plates, said upper lateral flanges of the end plates coacting with the longitudinal flanges of the fuel basket and with the longitudinal U-shaped reinforcing strips to form a horizontal utensil-supporting surface at the top of the grill with the grill in said upright position, and hanger elements projecting outwardly from the fuel basket and adapted to suspend food racks in vertical planes along the vertical side walls of the fuel basket, the outer ends of the upper and lower pairs of lateral extensions of the end plates being disposed in parallel planes and adapted to engage the ground when the grill is shifted from the upright position to said horizontal position, whereby said exentsions support the fuel basket in said generally horizontal position for cooking above one side wall thereof.

3. A portable cooking grill adapted to be used selectively in an upright position or in a generally horizontal position, said grill comprising a fuel basket formed of sheet metal having apertures formed therein, said fuel basket normally residing in said upright position and having a pair of generally vertical side walls spaced apart from one another, a pair of end plates secured to the opposite ends of the fuel basket, each of said end plates being symmetrical in outline configuration, each end plate being of one-piece sheet metal construction and having upper and lower pairs of lateral extensions projecting horizontally outwardly in opposite directions with the grill in said upright position, the upper and lower edges of said lateral extensions being delineated by respective parallel upper and lower lateral reinforcing flanges extending inwardly therefrom, the lower lateral reinforcing flanges forming a base adapted to rest upon the ground to support and stabilize the grill in said upright position, the upper edges of the vertical side walls of said fuel basket having longitudinal flanges projecting outwardly in opposite directions in a horizontal plane, a pair of longitudinal reinforcing strips attached to the outer edge portions of the flanges of the fuel basket, said upper lateral flanges, the longitudinal flanges of the fuel basket and the longitudinal reinforcing strips being disposed in a common plane and coacting to form a horizontal utensil-supporting surface at the top of the grill with the grill in said upright position, means for suspending food racks in vertical planes along the vertical side walls of the fuel basket, the outer ends of the upper and lower pairs of lateral extensions of the end plartes being disposed in parallel planes and adapted to engage the ground when the grill is shifted from the upright position to said horizontal position, whereby said extensions support the fuel basket in said generally horizontal position for cooking above one side wall thereof, and a generally U-shaped bail having a pair of parallel limbs joined by a cross element, the outer ends of said parallel limbs being pivotally connected to the upper portion of said end plates, whereby the grill may be suspended from said bail in an upright position, the parallel limbs of said bail having a length which is sufficient to locate the cross member thereof in alignment with the ends of said lower pair of lateral extensions upon pivotal motion of the bail toward said lower pair of extensions, thereby adapting the bail to be pivoted to a position bring the cross member thereof into supporting engagement with said lower pair of extensions when the grill is shifted from the upright position, whereby the cross member of the bail and the lateral extensions coact to provide a food support, spaced above the horizontal side of the fuel basket.

References Cited in the file of this patent
UNITED STATES PATENTS

| | | |
|---|---|---|
| 2,828,733 | Moore | Apr. 1, 1950 |
| 2,619,951 | Kahn | Dec. 2, 1952 |
| 2,774,345 | Peplin | Dec. 18, 1956 |
| 2,962,019 | Lundgren | Nov. 29, 1960 |